United States Patent
Beltman et al.

(10) Patent No.: US 10,909,017 B2
(45) Date of Patent: Feb. 2, 2021

(54) LATENCY REPORTING FOR ALGORITHM WEIGHTING IN MULTIAGENT SYSTEMS

(71) Applicant: Intel Corporation, Santa Clara, CA (US)

(72) Inventors: Willem Beltman, West Linn, OR (US); Omesh Tickoo, Portland, OR (US); Jonathan J. Huang, Pleasanton, CA (US); Glen Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 494 days.

(21) Appl. No.: 15/855,382

(22) Filed: Dec. 27, 2017

(65) Prior Publication Data

US 2019/0050318 A1 Feb. 14, 2019

(51) Int. Cl.
*G06F 11/34* (2006.01)
*G06F 9/50* (2006.01)
*G06F 11/30* (2006.01)

(52) U.S. Cl.
CPC ........ *G06F 11/3428* (2013.01); *G06F 9/5072* (2013.01); *G06F 9/5083* (2013.01); *G06F 11/3058* (2013.01); *G06F 11/3433* (2013.01)

(58) Field of Classification Search
CPC ............. G06F 11/3428; G06F 11/3058; G06F 11/3433; G06F 9/5072; G06F 9/5083
See application file for complete search history.

(56) References Cited

U.S. PATENT DOCUMENTS

| | | | | |
|---|---|---|---|---|
| 8,718,797 B1* | 5/2014 | Addepalli | ............... | H04L 67/12 700/17 |
| 9,465,622 B2* | 10/2016 | Jagatheesan | ........ | G06F 12/0653 |
| 10,163,420 B2* | 12/2018 | Dutt | ..................... | G06N 3/0472 |
| 2013/0205412 A1* | 8/2013 | Ricci | ................... | G06F 11/0739 726/29 |
| 2013/0219039 A1* | 8/2013 | Ricci | ................... | H04B 1/3822 709/223 |
| 2014/0375505 A1* | 12/2014 | Anderson | ............. | G01S 5/0226 342/464 |
| 2015/0056960 A1* | 2/2015 | Egner | ................... | H04W 4/027 455/411 |
| 2016/0162022 A1* | 6/2016 | Seth | ........................ | G06F 3/017 345/156 |
| 2016/0192145 A1* | 6/2016 | Alsehly | ................. | H04W 4/029 455/456.1 |
| 2016/0306895 A1* | 10/2016 | Kaewell | .................. | H04L 67/02 |
| 2017/0132285 A1* | 5/2017 | Ji | ...................... | G06F 16/24568 |
| 2017/0272972 A1* | 9/2017 | Egner | ................. | H04L 47/2441 |
| 2018/0247067 A1* | 8/2018 | Hrabak | ............... | G06F 21/6218 |
| 2018/0368019 A1* | 12/2018 | Nammi | .................. | H04B 7/063 |

* cited by examiner

*Primary Examiner* — Raymond L Nimox
(74) *Attorney, Agent, or Firm* — Spectrum IP Law Group LLC

(57) ABSTRACT

An apparatus of a multiagent system comprises a processing unit to process a unit of analysis on sensor data received from a sensor, and to provide a latency estimate to process the unit of analysis, and a decision system coupled with the processing unit to execute a decision process in response to an event, wherein the decision system utilizes the latency estimate as part of the decision process.

22 Claims, 12 Drawing Sheets

US 10,909,017 B2

LATENCY REPORTING FOR ALGORITHM WEIGHTING IN MULTIAGENT SYSTEMS

FIELD

The present disclosure generally relates to the field of electronics. More particularly, an embodiment relates to multiagent systems.

BACKGROUND

Latency is a factor for decision making in coordinated multiagent systems that involve fast decision-making where the individual agents may be operating autonomously but also in relation to one another. Examples of such multiagent systems include automobiles or drones moving at high speed, or automobiles that encounter a sudden traffic event such as a lane change or crossing an intersection. The agents inevitably encounter situations that involve split second decision making. Having information for such a quick decision is fundamental to making a proper decision, as is having a measure for the reliability of such information. Latency is a large factor in such processes involving multiple moving vehicles. Having latency available will enable better decision making and allow for safer and more reliable operation of for example cars and drones. For example, if a unit of analysis is expected to take a long time to process, the decision-making system of an agent may not wait for that unit of analysis or a sensor feed from a given agent device.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Figure 1:
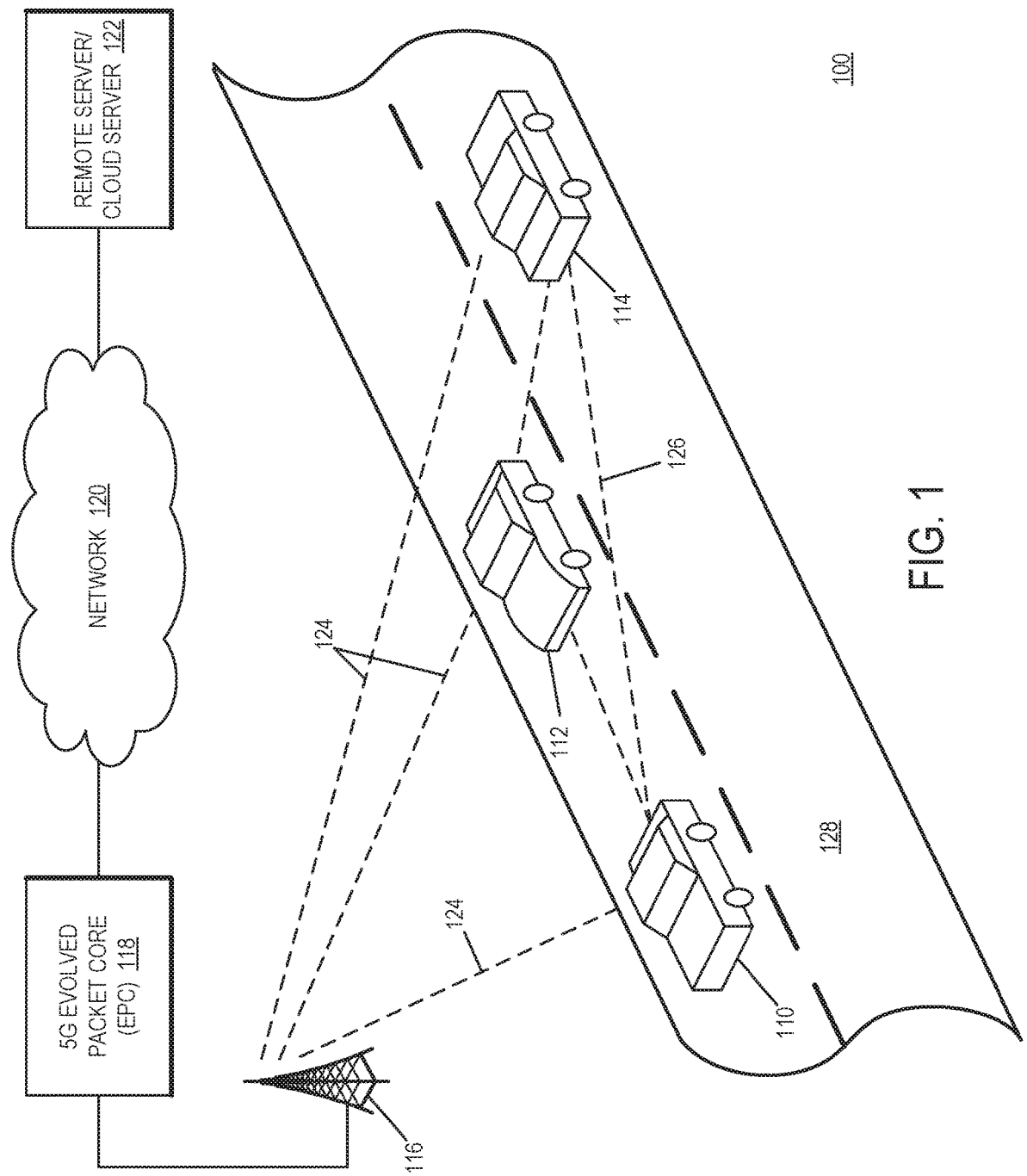
FIG. 1 is a diagram a multiagent automobile system in accordance with one or more embodiments.

Referring now to FIG. 1, a diagram a multiagent automobile system in accordance with one or more embodiments will be discussed. As shown in FIG. 1, a multiagent system that accommodates latency may include an automobile system 100 in which one or more automobiles or cars such as car 110, car 112, and/or car 114 are driving on a roadway 128. Although three cars are shown in FIG. 1 for purposes of discussion, automobile system 100 may include any number of cars, N cars, and the scope of the claimed subject matter is not limited in this respect. One or more of the cars may include a decision-making system coupled to one or more sensors to obtain data to be processed for a decision making, for example to implement autonomous driving or driver assistance for the cars while being operated on the roadway 128.

In one or more embodiments of the automobile system 100 of FIG. 1 or similar systems such as a multiagent drone system, the cars, drones or other systems will report sensor analysis status, especially predicted latency, to each other, even before a unit of analysis is done by any of the individual processing systems in each car or other agent. A unit of analysis may refer a piece of data from a sensor, an algorithm or routine, logic, and/or process any other input or data to be processed, analyzed, and/or transferred, to arrive at result or data to be provided as an input to a decision-making processor, decision-making system, or decision-making logic, instructions, or software, although the scope of the claimed subject matter is not limited in these respects. Such an arrangement may allow each individual processing system in each agent to consider and accommodate latency information its respective decision-making algorithms when making a decision, for example to determine whether or not there is sufficient time to wait for sensor data before a decision should be made and the corresponding action taken. In such multiagent systems such as automobile system 100 of FIG. 1, one individual car or other agent may obtain data not only from its own sensors, but also from one more other sensors from one or more of the other cars or other agents. To assist with fast decision-making processes, the latency of data transfer between the cars or other agents may be considered, wherein having lower latency in the data transfer facilitates the ability of one car to utilize data from one or more other cars or agents in the decision-making process. In such embodiments as discussed herein, cars, drones or other systems will report sensor analysis status, especially predicted latency, to each other, even before a unit of analysis is done. This will be useful for cross-car or system data sharing, especially when data from one car feeds into an algorithm on another car or multiple cars contribute to a cloud-based analysis. For example, if a unit of analysis is expected to take a long time, the algorithm may not wait for a unit of analysis or a sensor feed from a given car.

The technology of cellular networks is advancing to provide lower latency communication between devices or network nodes on the network. For example, one or more of the cars may be coupled with a wireless network or wireless communication, for example one or more of the cars may be coupled with an evolved NodeB (eNB) 116 of a wireless network operating in accordance with a Third Generation Partnership Project (3GPP) standard. In such embodiments, eNB 116 may be part of a Fifth Generation (5G) Evolved Packet Core (EPC) 118 that operates in accordance with a 5G New Radio standard wherein one or more of the cars may operate as a user equipment (UE) device on although the scope of the claimed subject matter is not limited in this respect. It should be noted that one of the advances promulgated in 5G networks is to provide lower latency in data transmissions than is currently provided by networks operating in accordance with Long-Term Evolution (LTE) standards. In the frame structures of LTE standards, the smallest transmission time interval (TTI) length may be as low as 1 millisecond (ms), whereas in the frame structures of 5G standards the TTI length is expected to be on the order of 0.5 ms or lower, providing much lower latency in the transfer of data between devices of automobile network 100. One or more of the cars therefore may include a 5G New Radio that supports low latency, high reliability, low bandwidth peer-to-peer communication within about 100 meters. Since these low latency radio exchanges will now be faster than most onboard or course cloud-based sensor analysis, sharing status information and reporting latency via these fast exchanges may incorporated as part of the decision-making process implemented by one of more of the cars. The 5G based radio technology then may be used to transmit latency information to one or more other cars or processing systems, which can be used in quick decision-making logic implemented by any individual car or agent.

Thus, the cars of automobile network 100 may be in communication with one another for data transfer via eNB 116 of a 5G based EPC 118. EPC 118 in turn may be coupled to a network 120 such as the Internet to allow one or more of the cars to couple to a remote server 122 or cloud server to facilitate coordination of data collated from one or more cars to assist with or provide decision making facilities for the one or more cars, or for example to provide updates to the algorithms running on the decision-making systems in one or more of the cars based on crowdsourced or machine learning techniques, although the scope of the claimed subject matter is not limited in these respects. For example, remote server 122 may provide additional processing power to a decision-making process, and further may use various algorithms such as machine learning or deep learning to the decision-making process for any one or more of the cars, individually or collectively, and the scope of the claimed subject matter is not limited in these respects. The processing results of remote server 122 may then be transmitted back to the one or cars via the radio links of EPC 118 provided by eNB 116. In one or more embodiments, the radio links with EPC 118 via eNB 116 may be utilized, for example, to transmit the sensor data of one or more cars or other agents to one or more other agents to facilitate the decision-making process of a given vehicle or agent.

In some embodiments, one or more of the cars may communicate directly with one or more other cars in proximity to each other. For example, a mesh network 126 or similar network may be established between two or more adjacent cars or other agents, for example using any suitable radio technology such as wireless communication in compliance with an Institute of Electrical and Electronics Engineers (IEEE) 802.11x standard or the like, or using proximity-based services (ProSe) sidelink in accordance with a Third Generation Partnership Project (3GPP) standards using a PC5 interface between one or more cars or other agents, although the scope of the claimed subject matter is not limited in these respects. In one or more embodiments, such a mesh network 126 or sidelink may be utilized, for example, to transmit the sensor data of one or more cars or other agents to one or more other agents to facilitate the decision-making process of a given vehicle or agent. Such a mesh network 126 or sidelink may be used alone or in combination with the radio link to EPC 118 via eNB 116, although the scope of the claimed subject matter is not limited in this respect. The decision-making process of any one or more vehicles, alone or in combination with one another, or by remote server 122, alone or in combination with one or more cars or other agents, may be performed by a processing system as shown in and described with respect to FIG. 2, below.

Figure 2:
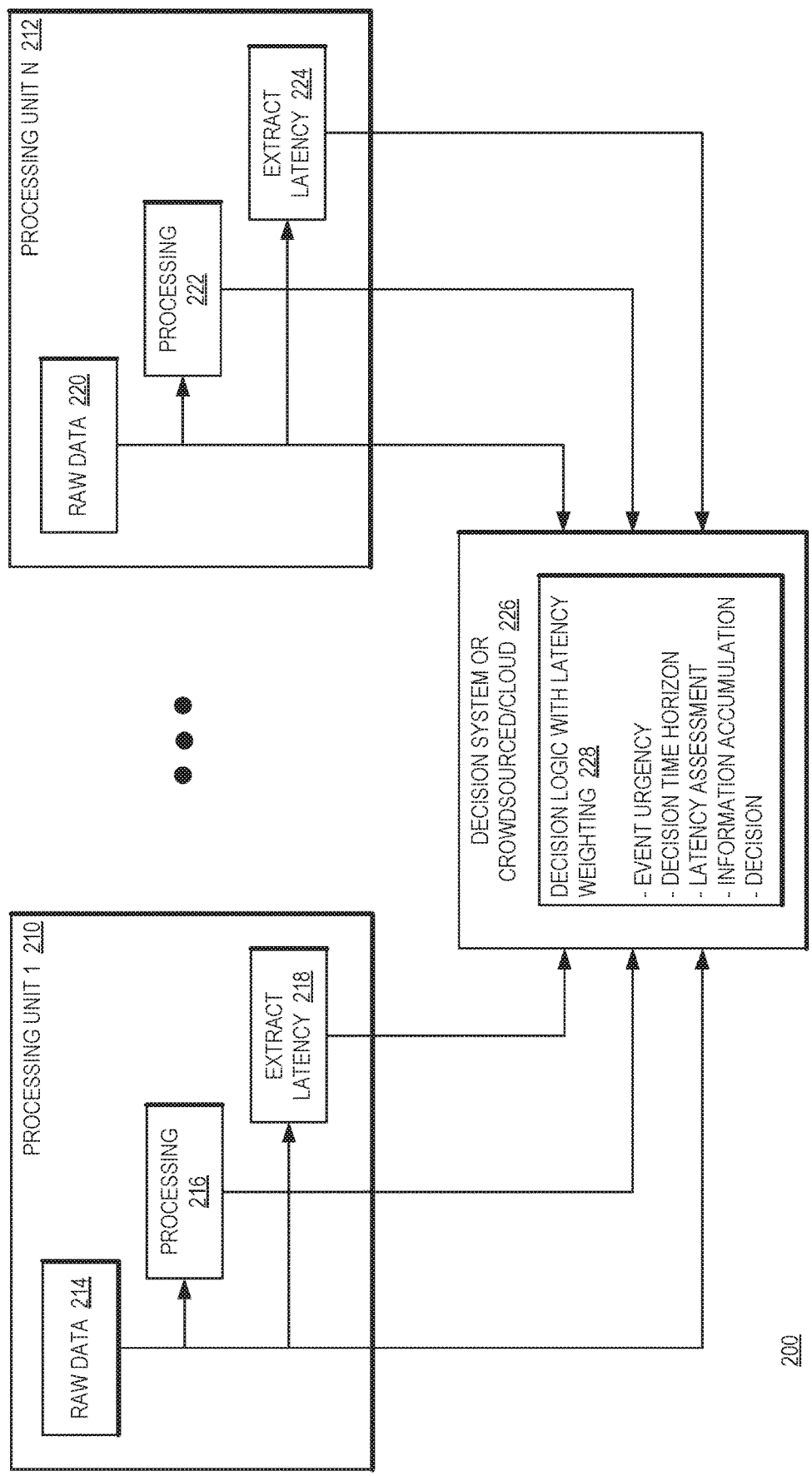
FIG. 2 is a diagram of a multiagent processing system able to include latency in the decision process in accordance with one or more embodiments.

Referring now to FIG. 2, a diagram of a multiagent processing system able to include latency in the decision process in accordance with one or more embodiments will be discussed. The processing system 200 of FIG. 1 may include one or more processing units such processing unit 210, up to an Nth processing unit, processing unit N 212. One processing unit may be included in one or more of the cars of FIG. 1, respectively, or in other types of agent devices. A decision system 226 also may be included in each of the one or more cars or other agents, for example where each of the individual cars or agent devices are able to make local, on-board decisions. Alternatively, decision system 226 may be implemented as a crowdsourced or cloud based decision making device, for example where two or more of the cars or agent devices cooperate to make a decision, or where at least some of the decision-making process is at least partially performed in a remote device such as a remote server 122 or cloud server as shown in FIG. 1, or any combination thereof, and the scope of the claimed subject matter is not limited in these respects.

In some embodiments, decision system 226, or crowdsourced/cloud system, may receive inputs from one or several systems in proximity to the decision system 227, for example from processing unit 1 210 up to processing unit N 212. These processing units may transmit parts of raw data 214 and/or raw data 220, bandwidth permitting, and higher level processed data from one or more processing units such as processing unit 216 and/or processing unit 222. For example, higher level processed data from the processing units may be obtained using convolutional neural network (CNN) and/or deep neural network (DNN) computer vision algorithms on raw data obtained from one or more cameras of the cars or other agents. In addition to raw data and high-level processing information, the one or more processing units also may transmit the actual and/or predicted latency data pertaining to latency of obtaining the raw data and/or the latency of the higher-level processing, for example based on updated estimates over time. The latency data may be based on algorithms or logic implemented by the processing units via latency extraction processing unit 218 and/or latency extraction processing unit 218 which may be realized as computer or machine code executed by the processing units, and/or by circuits built into or otherwise coupled with the processing units. The extracted latency information also may include the latency of transferring data via the 5G EPC 118 as shown in FIG. 1, although the scope of the claimed subject matter is not limited in this respect.

The latency extraction and/or estimating process may involve each processing unit having accurate time-stamping of when it receives the raw data and when it processes higher-level processed results to extract or estimate the processing latency. Likewise, the decision system 216 may have accurate time-stamping of when it receives each data package from one or more processing units to estimate the transmission and/or processing latency. With some observations of recent-past observed latencies for each operation, the decision system 226 can model each latency with a probabilistic distribution.

In one or more embodiments, decision system 226 includes decision logic with latency weighting block 228, which may be realized as computer-readable or machine-readable code, and/or with logic and/or circuitry. As will be discussed further below, the decision logic with latency weighting block 228 may be used to involve and/or accommodate latency information in decision-making processes or algorithms, and may take into consideration latency related factors such as event urgency, the decision-making time horizon, the latency assessment or estimate from the latency extraction processing units including latency extraction processing unit 218 up to latency extraction processing unit 224, information accumulation for example from one or more similar prior events and/or from one or more sensors, to implement a decision and to take any action in response to the decision.

In one or more embodiments, the decision logic 228 of decision system 226 may take into account the latency in the decision-making process through weighting of several factors. The decision system 226 may establish the urgency of the decision. For example, airbag deployment or the detection of a pedestrian in front of a fast-moving vehicle may be high priority situations. The decision system 226 also may establish a time horizon in order to make a decision. The time horizon may be based on an extrapolation of vehicle speed and/or distance. In other cases, the time horizon may by such that for an airbag deployment, immediate action may be required. The decision system 226 may assess the time horizon with the reported latencies across multiple processing units and/or cars or other agents to determine if the decision system 226 can wait for a next transmission of more recent and accurate information, or if the decision system 226 cannot wait and needs to proceed based on previous high-level data, raw data including its own processing latency, and/or buffered data, or a combination thereof.

The estimate of the status of unit of analysis should be faster than the actual unit of analysis to provide a satisfactory decision. Many types of fast status-monitoring techniques may be utilized, for example any complex algorithm may report the beginning of the unit of analysis, and a simple average of previous analysis times could provide an estimate of the latency. Alternatively, electrical monitoring of sensors may show activations prior to the analysis, allowing a timestamped status of the sensor activation ahead of the algorithm.

The decision system 226 may accumulate the data from the various sources, for example based on the information collected and/or determined as discussed above. Based at least in part on the urgency and/or nature of the event, the decision system 226 may prioritize certain sources of data or sensors over others. The decision system 226 also may start logging data to preserve information for post event assessments, for example to be considered in further decision processes. The decision system 226 then may make a decision based on the target data and then may take appropriate action in response to the decision. It should be noted that the factors involved in the decision process as discussed above are merely examples of how latency related information may be taken into account by decision system 226, and the scope of the claimed subject matter is not limited in these respects. An example decision flow that may be implemented by decision system 226 that accommodates latency information is shown in and described with respect to FIG. 3, below.

Figure 3:
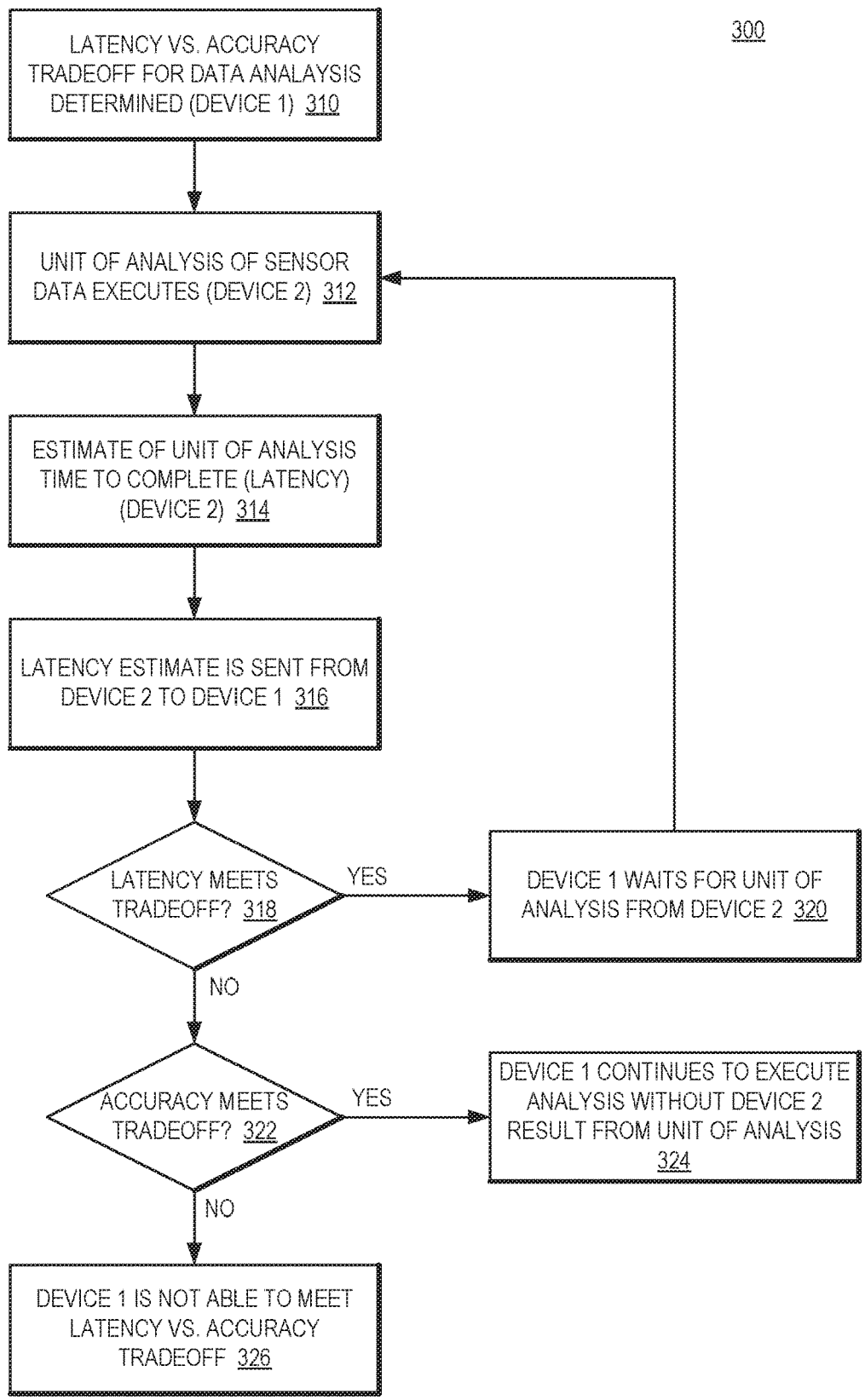
FIG. 3 is a flow diagram of a decision process that accommodates latency in accordance with one or more embodiments.

Referring now to FIG. 3, a flow diagram of a decision process that accommodates latency in accordance with one or more embodiments will be discussed. Although FIG. 1 shows one particular order of a decision process 300 that considers latency, it should be noted that decision process 300 may include more or fewer operations than shown and also may include various other orders of the operations than shown, and the scope of the claimed subject matter is not limited in these respects. Decision process 300 may be performed at least in part by decision system 226 implemented at least in part by any one or more of the cars or other agents as shown in FIG. 1, either individually or on combination with one or more other cars or agents, and/or may be implemented at least in part by remote server 122 or a cloud server as shown in FIG. 1, either by itself or in combination with one or more other cars or agents, and the scope of the claimed subject matter is not limited in this respect. In the example shown in FIG. 1, Device 1 may refer to a first car or agent and/or a first or second remote server 122, and Device 2 may refer to a second car or agent and/or a first or second remote server 122, and the scope of the claimed subject matter is not limited in these respects.

At operation 310, Device 1 may determine a latency versus accuracy tradeoff for data analysis. At operation 312, a unit of analysis of sensor data may be executed on Device 2. Device 2 may then estimate the time to complete a unit of analysis to provide a latency estimate at operation 314. Device 2 may then send this latency estimate to Device 1 at operation 316. A determination may then be made, for example by Device 1, at decision block 318 whether the latency estimate meets one or more tradeoffs for time, for example whether there enough time in the decision time horizon to wait for the unit of analysis from Device 2 in view of the latency estimate. If the latency estimate meets the tradeoff, then at operation Device 1 may wait for the unit of analysis to be completed and sent to Device 1 from Device 2. Decision process 300 may then continue at operation 312 for one or more additional units of analysis to be executed on Device 2.

If the latency estimate does not meet the tradeoff for time as determined at decision block 318, then a determination may be made at decision block 322 whether the accuracy tradeoff is met, for example whether Device 1 is capable of providing an accurate decision without the benefit of the unit of analysis being executed on Device 2. If the accuracy tradeoff is met, then Device 1 continues to execute a decision analysis at operation 324 without the benefit of the unit of analysis being executed on Device 2. If the accuracy tradeoff is not met as determined at decision block 322, then Device 1 determines at operation 326 that it is not able to meet the latency versus accuracy tradeoff in the decision process, and may take an appropriate action in response. For example, Device 1 may execute a default decision rather than use the results of a current decision process. It should be noted that although the decision process 300 of FIG. 3 was discussed in the context of a multiagent automobile system 100 as shown in FIG. 1, the decision process 300 likewise may be applied to various other multiagent systems, for example a multiagent drone system as shown in and described with respect to FIG. 4, below.

Figure 4:
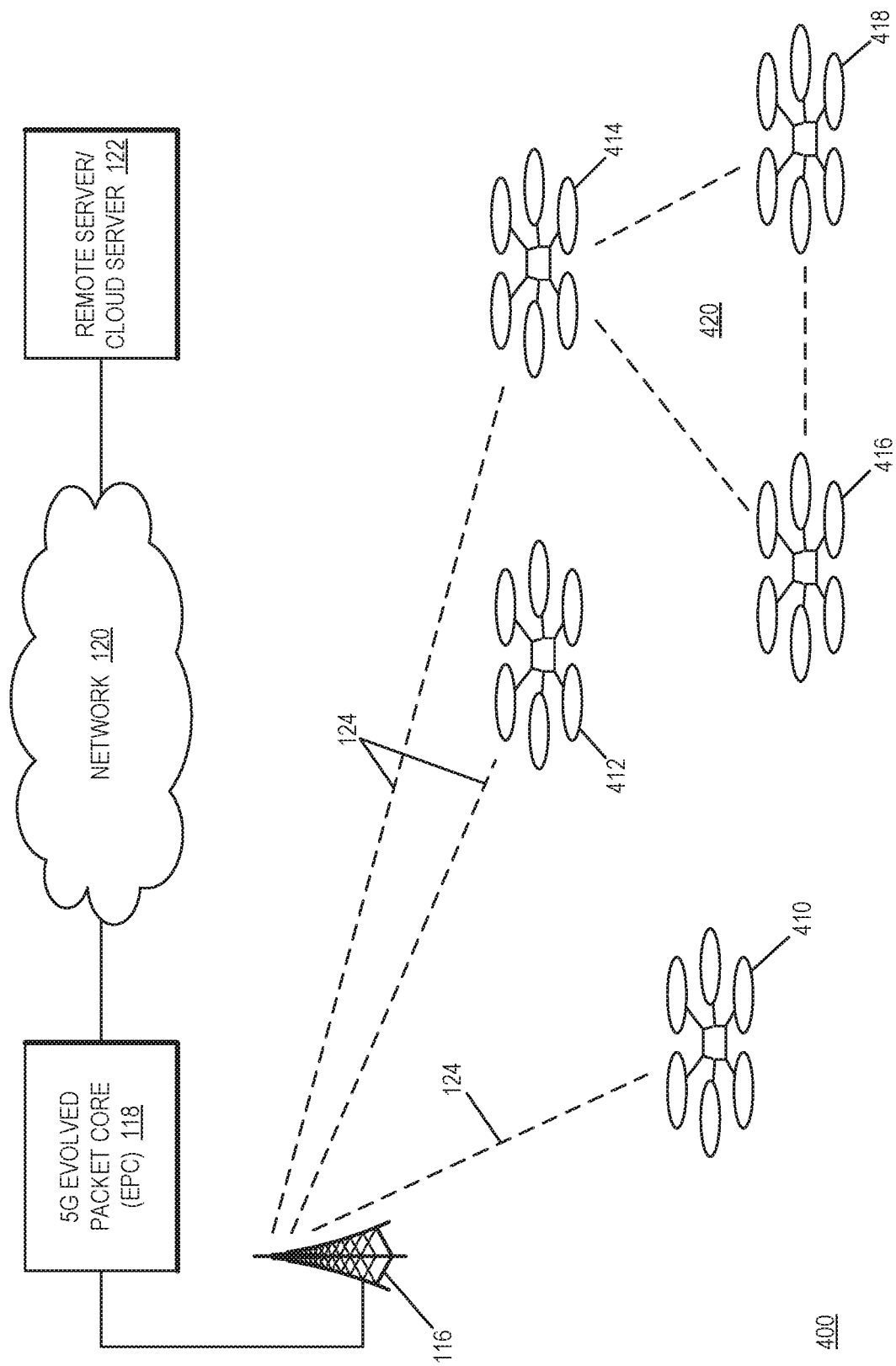
FIG. 4 is a diagram of a multiagent drone system in accordance with one or more embodiments.

Referring now to FIG. 4, a diagram of a multiagent drone system in accordance with one or more embodiments will be discussed. The multiagent drone system 400 of FIG. 4 may be substantially similar to the multiagent multiple automobile system 100 of FIG. 1 except that the multiagent drone system 400 may comprise one or more drones as the agent, for example drone 410, drone 412, drone 414, drone 416, and/or drone 418. A drone may comprise an unmanned aerial vehicle that may be operated by a human operation, for example via remote control or via a computer program or machine instructions executed by a processor of the drone as programmed by an operator, or may include an autonomous system to allow the drone to operate independently and dynamically responsive to one or more other drones and/or obstacles in the surrounding environment, although the scope of the claimed subject matter is not limited in these respects. One or more embodiments, one or more drones may be in communication with one another via one or more radio links 124 of eNB 116 as discussed with respect to FIG. 1, above. Alternatively or in addition to the radio links 124, one or more of the drones may be in communication with one or more other drones via a mesh network 420 or similar type of network, for example for example using any suitable radio technology such as wireless communication in compliance with an Institute of Electrical and Electronics Engineers (IEEE) 802.11x standard or the like, or using proximity-based services (ProSe) sidelink in accordance with a Third Generation Partnership Project (3GPP) standards using a PC5 interface between one or more cars or other agents, although the scope of the claimed subject matter is not limited in these respects. One or more of the drones may include one or more processing units and one or more decision systems 226 as discussed, above, to implement a decision-making process that includes latency such as decision process 300 of FIG. 3. Furthermore, although an automobile system 100 and a drone system 400 are discussed herein, various other multiagent systems likewise may include one or more processing units and one or more decision system 226 to implement a decision process 300 that accommodates latency in the decision-making process as discussed herein, for example other vehicle systems such as airplanes, boats, helicopters, missiles, or space vehicles, and so on, and the scope if the claimed subject matter is not limited in these respects.

Figure 5:
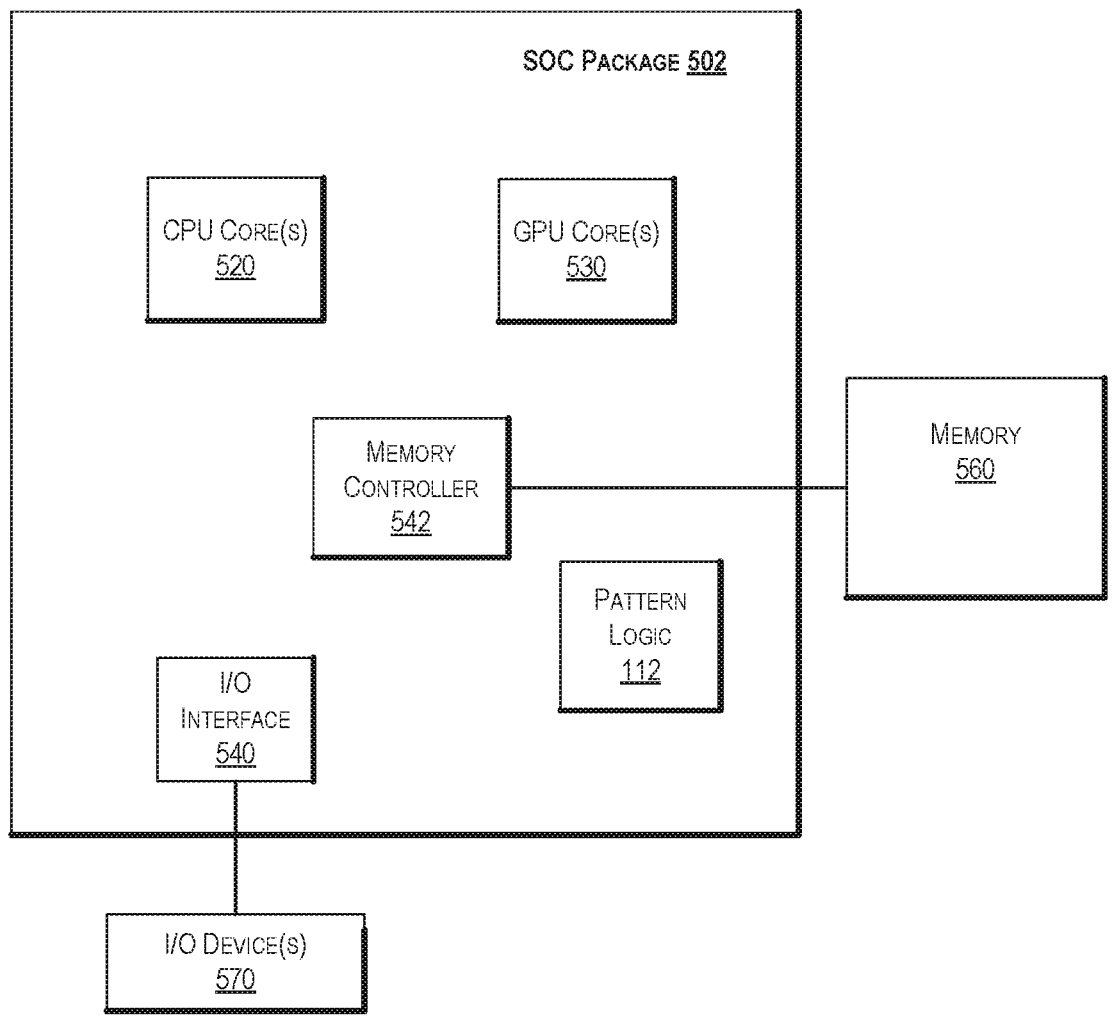
FIG. 5 illustrates a block diagram of a system on chip (SOC) package in accordance with an embodiment.

FIG. 5 illustrates a block diagram of a system on chip (SOC) package in accordance with an embodiment. As illustrated in FIG. 5, SOC 502 includes one or more Central Processing Unit (CPU) cores 520, one or more Graphics Processor Unit (GPU) cores 530, an Input/Output (I/O) interface 540, and a memory controller 542. Various components of the SOC package 502 may be coupled to an interconnect or bus such as discussed herein with reference to the other figures. Also, the SOC package 502 may include more or less components, such as those discussed herein with reference to the other figures. Further, each component of the SOC package 520 may include one or more other components, e.g., as discussed with reference to the other figures herein. In one embodiment, SOC package 502 (and its components) is provided on one or more Integrated Circuit (IC) die, e.g., which are packaged into a single semiconductor device.

As illustrated in FIG. 5, SOC package 502 is coupled to a memory 560 via the memory controller 542. In an embodiment, the memory 660 (or a portion of it) can be integrated on the SOC package 502.

The I/O interface 540 may be coupled to one or more I/O devices 570, e.g., via an interconnect and/or bus such as discussed herein with reference to other figures. I/O device(s) 570 may include one or more of a keyboard, a mouse, a touchpad, a display, an image/video capture device (such as a camera or camcorder/video recorder), a touch screen, a speaker, or the like.

Figure 6:
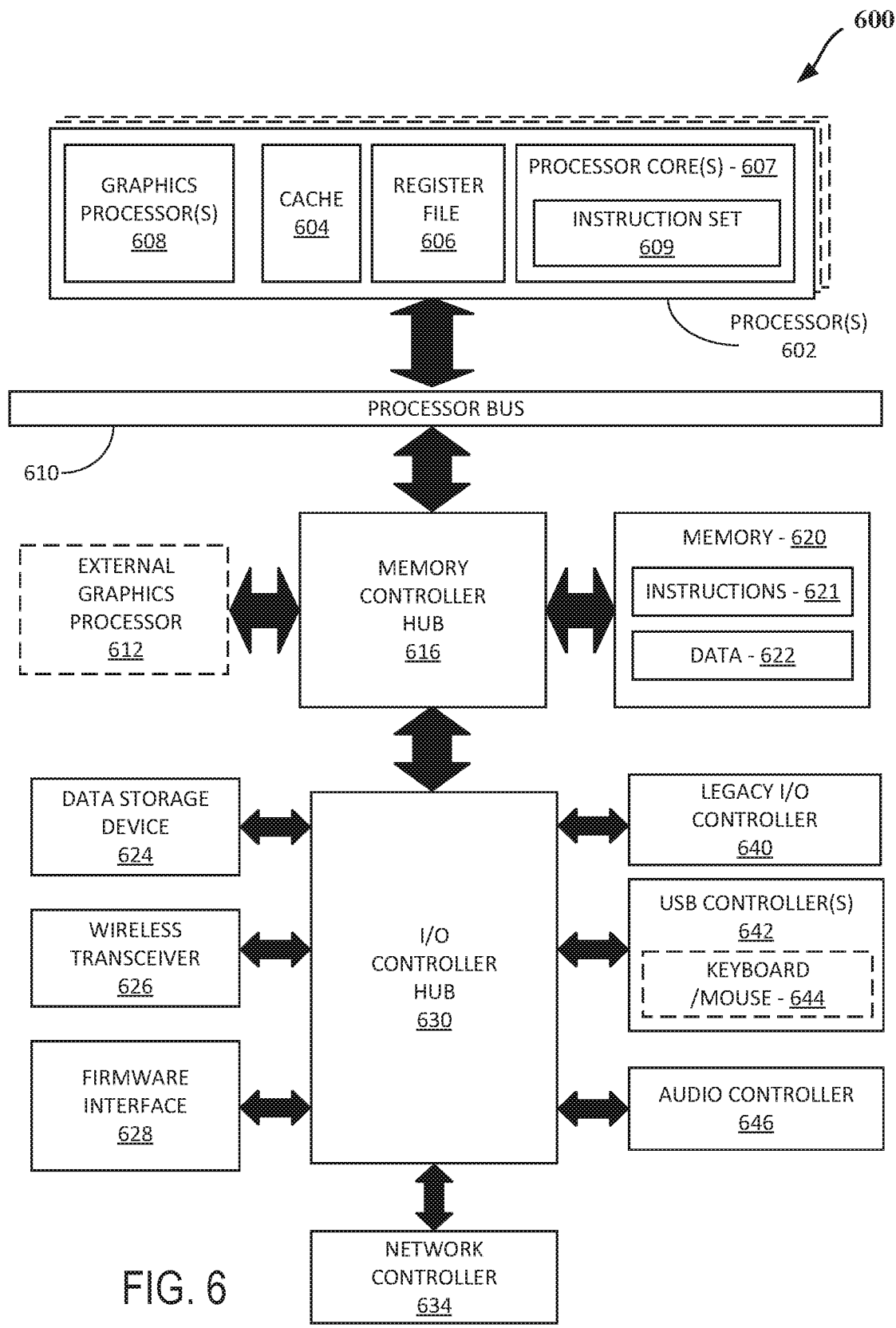
FIG. 6 is a block diagram of a processing system according to an embodiment.

FIG. 6 is a block diagram of a processing system 600, according to an embodiment. In various embodiments the system 600 includes one or more processors 602 and one or more graphics processors 608, and may be a single processor desktop system, a multiprocessor workstation system, or a server system having a large number of processors 602 or processor cores 607. In on embodiment, the system 600 is a processing platform incorporated within a system-on-a-chip (SoC or SOC) integrated circuit for use in mobile, handheld, or embedded devices.

An embodiment of system 600 can include, or be incorporated within a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include, couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 702 can have a single internal cache or multiple levels of internal cache. In some embodiments, the cache memory is shared among various components of the processor 602. In some embodiments, the processor 602 also uses an external cache (e.g., a Level-3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, processor 602 is coupled to a processor bus 610 to transmit communication signals such as address, data, or control signals between processor 602 and other components in system 600. In one embodiment the system 600 uses an exemplary "hub" system architecture, including a memory controller hub 616 and an Input Output (I/O) controller hub 630. A memory controller hub 616 facilitates communication between a memory device and other components of system 600, while an I/O Controller Hub (ICH) 630 provides connections to I/O devices via a local I/O bus. In one embodiment, the logic of the memory controller hub 616 is integrated within the processor.

Memory device 620 can be a dynamic random-access memory (DRAM) device, a static random-access memory (SRAM) device, flash memory device, phase-change memory device, or some other memory device having suitable performance to serve as process memory. In one embodiment the memory device 620 can operate as system memory for the system 600, to store data 622 and instructions 621 for use when the one or more processors 602 executes an application or process. Memory controller hub 616 also couples with an optional external graphics processor 612, which may communicate with the one or more graphics processors 608 in processors 602 to perform graphics and media operations.

In some embodiments, ICH 630 enables peripherals to connect to memory device 620 and processor 602 via a high-speed I/O bus. The I/O peripherals include, but are not limited to, an audio controller 646, a firmware interface 628, a wireless transceiver 626 (e.g., Wi-Fi, Bluetooth), a data storage device 624 (e.g., hard disk drive, flash memory, etc.), and a legacy I/O controller 640 for coupling legacy (e.g., Personal System 2 (PS/2)) devices to the system. One or more Universal Serial Bus (USB) controllers 642 connect input devices, such as keyboard and mouse 644 combinations. A network controller 634 may also couple to ICH 630. In some embodiments, a high-performance network controller (not shown) couples to processor bus 610. It will be appreciated that the system 600 shown is exemplary and not limiting, as other types of data processing systems that are differently configured may also be used. For example, the I/O controller hub 630 may be integrated within the one or more processor 602, or the memory controller hub 616 and I/O controller hub 630 may be integrated into a discreet external graphics processor, such as the external graphics processor 612.

Figure 7:
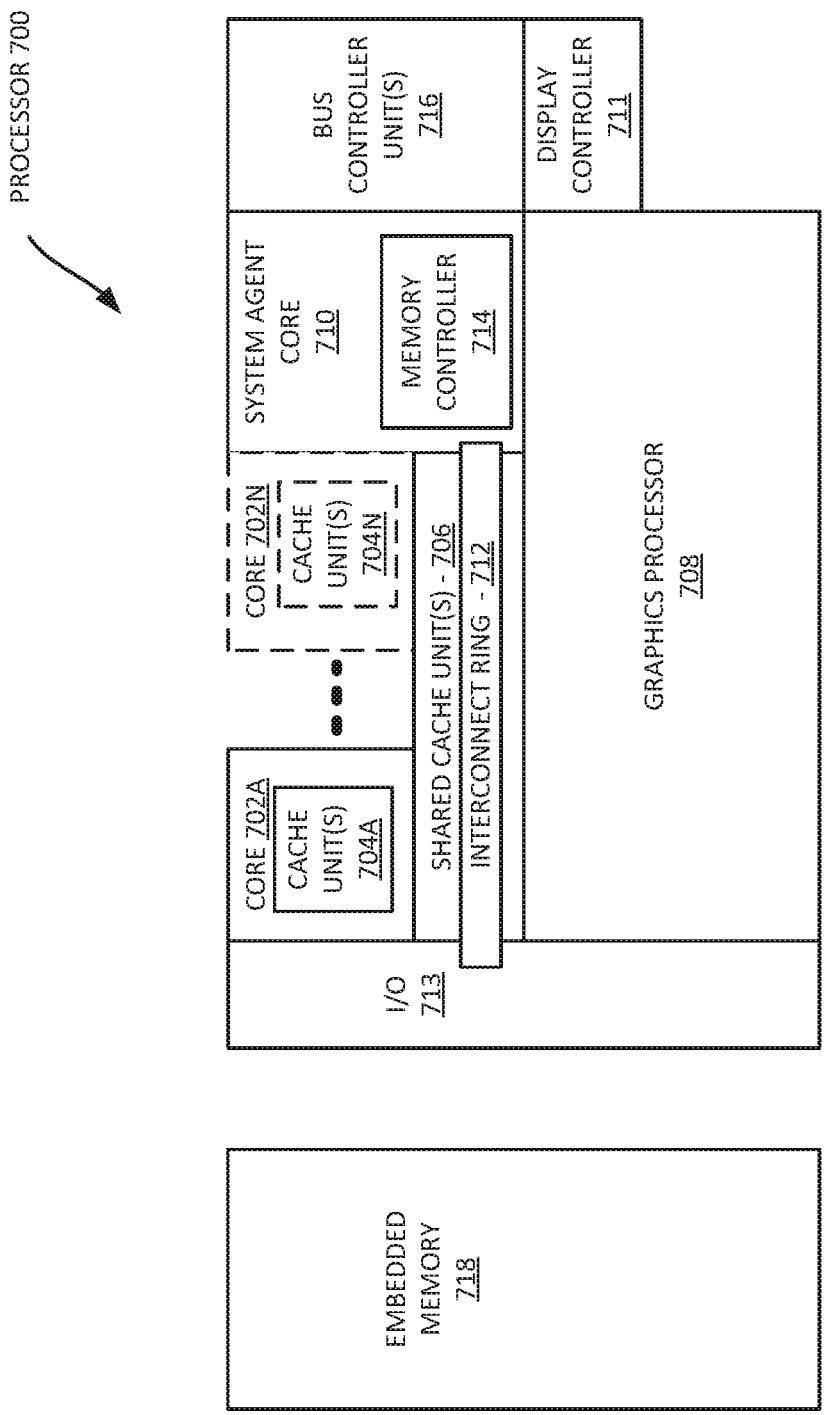
FIG. 7 is a block diagram of a processor having one or more processor cores, an integrated memory controller, and an integrated graphics processor in accordance with one or more embodiments.

FIG. 7 is a block diagram of an embodiment of a processor 700 having one or more processor cores 702A to 702N, an integrated memory controller 714, and an integrated graphics processor 708. Those elements of FIG. 7 having the same reference numbers (or names) as the elements of any other figure herein can operate or function in any manner similar to that described elsewhere herein, but are not limited to such. Processor 700 can include additional cores up to and including additional core 702N represented by the dashed lined boxes. Each of processor cores 702A to 702N includes one or more internal cache units 704A to 704N. In some embodiments each processor core also has access to one or more shared cached units 706.

The internal cache units 704A to 704N and shared cache units 706 represent a cache memory hierarchy within the processor 700. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 706 and 704A to 704N.

In some embodiments, processor 700 may also include a set of one or more bus controller units 716 and a system agent core 710. The one or more bus controller units 716 manage a set of peripheral buses, such as one or more Peripheral Component Interconnect buses (e.g., PCI, PCI Express). System agent core 710 provides management functionality for the various processor components. In some embodiments, system agent core 710 includes one or more integrated memory controllers 714 to manage access to various external memory devices (not shown).

In some embodiments, one or more of the processor cores 702A to 702N include support for simultaneous multi-threading. In such embodiment, the system agent core 710 includes components for coordinating and operating cores 702A to 702N during multi-threaded processing. System agent core 710 may additionally include a power control unit (PCU), which includes logic and components to regulate the power state of processor cores 702A to 702N and graphics processor 708.

In some embodiments, processor 700 additionally includes graphics processor 708 to execute graphics processing operations. In some embodiments, the graphics processor 708 couples with the set of shared cache units 706, and the system agent core 710, including the one or more integrated memory controllers 714. In some embodiments, a display controller 711 is coupled with the graphics processor 708 to drive graphics processor output to one or more coupled displays. In some embodiments, display controller 711 may be a separate module coupled with the graphics processor via at least one interconnect, or may be integrated within the graphics processor 708 or system agent core 710.

In some embodiments, a ring based interconnect unit 712 is used to couple the internal components of the processor 700. However, an alternative interconnect unit may be used, such as a point-to-point interconnect, a switched interconnect, or other techniques, including techniques well known in the art. In some embodiments, graphics processor 708 couples with the ring interconnect 712 via an I/O link 713.

The exemplary I/O link 713 represents at least one of multiple varieties of I/O interconnects, including an on package I/O interconnect which facilitates communication between various processor components and a high-performance embedded memory module 718, such as an eDRAM (or embedded DRAM) module. In some embodiments, each of the processor cores 702 to 702N and graphics processor 808 use embedded memory modules 718 as a shared Last Level Cache.

In some embodiments, processor cores 702A to 702N are homogenous cores executing the same instruction set architecture. In another embodiment, processor cores 702A to 702N are heterogeneous in terms of instruction set architecture (ISA), where one or more of processor cores 702A to 702N execute a first instruction set, while at least one of the other cores executes a subset of the first instruction set or a different instruction set. In one embodiment processor cores 702A to 702N are heterogeneous in terms of microarchitecture, where one or more cores having a relatively higher power consumption couple with one or more power cores having a lower power consumption. Additionally, processor 700 can be implemented on one or more chips or as an SoC integrated circuit having the illustrated components, in addition to other components.

Figure 8:
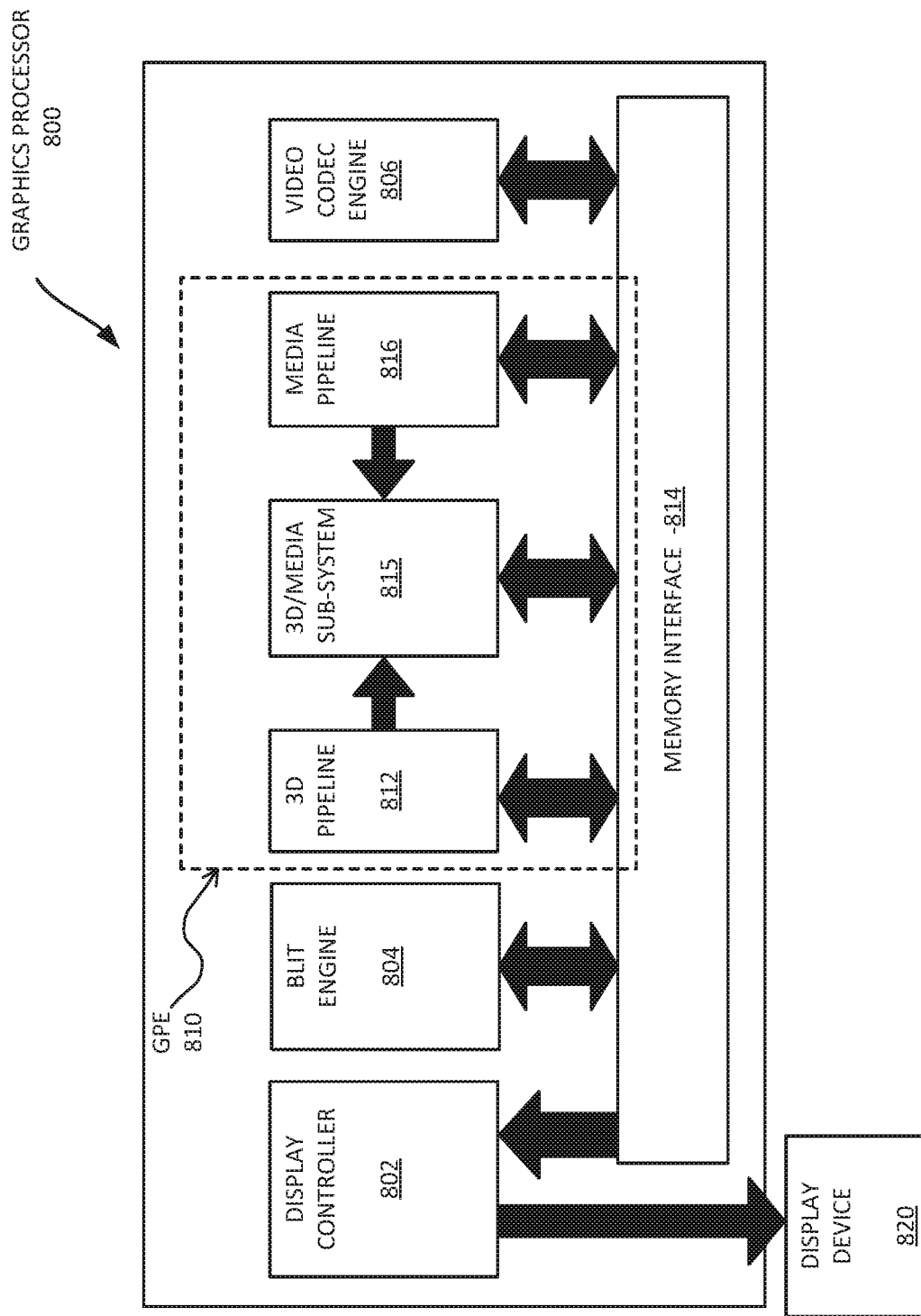
FIG. 8 is a block diagram of a graphics processor, which may be a discrete graphics processing unit, or may be a graphics processor integrated with a plurality of processing cores in accordance with one or more embodiments.

FIG. 8 is a block diagram of a graphics processor 800, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 800 includes a memory interface 814 to access memory. Memory interface 814 can be an interface to local memory, one or more internal caches, one or more shared external caches, and/or to system memory.

In some embodiments, graphics processor 800 also includes a display controller 802 to drive display output data to a display device 820. Display controller 802 includes hardware for one or more overlay planes for the display and composition of multiple layers of video or user interface elements. In some embodiments, graphics processor 800 includes a video codec engine 806 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 800 includes a block image transfer (BLIT) engine 804 to perform two-dimensional (2D) rasterizer operations including, for example, bit-boundary block transfers. However, in one embodiment, 2D graphics operations are performed using one or more components of graphics processing engine (GPE) 810. In some embodiments, graphics processing engine 810 is a compute engine for performing graphics operations, including three-dimensional (3D) graphics operations and media operations.

In some embodiments, GPE 810 includes a 3D pipeline 812 for performing 3D operations, such as rendering three-dimensional images and scenes using processing functions that act upon 3D primitive shapes (e.g., rectangle, triangle, etc.). The 3D pipeline 812 includes programmable and fixed function elements that perform various tasks within the element and/or spawn execution threads to a 3D/Media sub-system 815. While 3D pipeline 812 can be used to perform media operations, an embodiment of GPE 810 also includes a media pipeline 816 that is specifically used to perform media operations, such as video post-processing and image enhancement.

In some embodiments, media pipeline 816 includes fixed function or programmable logic units to perform one or more specialized media operations, such as video decode acceleration, video de-interlacing, and video encode acceleration in place of, or on behalf of video codec engine 806. In some embodiments, media pipeline 816 additionally includes a thread spawning unit to spawn threads for execution on 3D/Media sub-system 815. The spawned threads perform computations for the media operations on one or more graphics execution units included in 3D/Media subsystem 815.

In some embodiments, 3D/Media subsystem 815 includes logic for executing threads spawned by 3D pipeline 812 and media pipeline 816. In one embodiment, the pipelines send thread execution requests to 3D/Media subsystem 815, which includes thread dispatch logic for arbitrating and dispatching the various requests to available thread execution resources. The execution resources include an array of graphics execution units to process the 3D and media threads. In some embodiments, 3D/Media subsystem 815 includes one or more internal caches for thread instructions and data. In some embodiments, the subsystem also includes shared memory, including registers and addressable memory, to share data between threads and to store output data.

Figure 9:
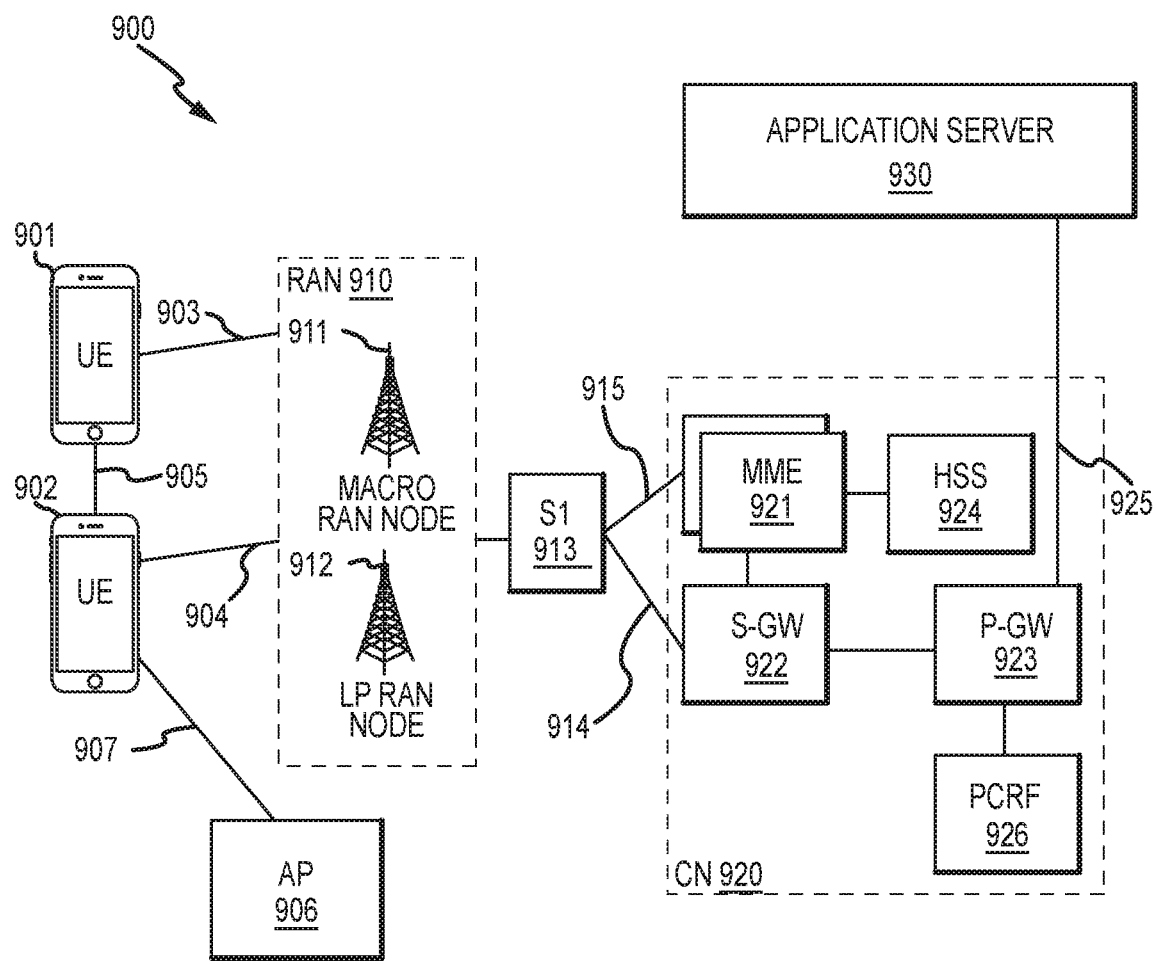
FIG. 9 illustrates an architecture of a system of a network in accordance with one or more embodiments.

FIG. 9 illustrates an architecture of a system 900 of a network in accordance with some embodiments. The system 900 is shown to include a user equipment (UE) 901 and a UE 902. The UEs 901 and 902 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, automobile or automobile system, or any computing device including a wireless communications interface.

In some embodiments, any of the UEs 901 and 902 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 and 902 may be configured to connect, e.g., communicatively couple, with a radio access network (RAN) 910—the RAN 910 may be, for example, an Evolved Universal Mobile Telecommunications System (UMTS) Terrestrial Radio Access Network (E-UTRAN), a NextGen RAN (NG RAN), or some other type of RAN. The UEs 901 and 902 utilize connections 903 and 904, respectively, each of which comprises a physical communications interface or layer (discussed in further detail below); in this example, the connections 903 and 904 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 901 and 902 may further directly exchange communication data via a ProSe interface 905. The ProSe interface 905 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 902 is shown to be configured to access an access point (AP) 906 via connection 907. The connection 907 can comprise a local wireless connection, such as a connection consistent with any IEEE 802.11 protocol, wherein the AP 906 would comprise a wireless fidelity (WiFi®) router. In this example, the AP 906 is shown to be connected to the Internet without connecting to the core network of the wireless system (described in further detail below).

The RAN 910 can include one or more access nodes that enable the connections 903 and 904. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 910 may include one or more RAN nodes for providing macrocells, e.g., macro RAN node 911, and one or more RAN nodes for providing femtocells or picocells (e.g., cells having smaller coverage areas, smaller user capacity, or higher bandwidth compared to macrocells), e.g., low power (LP) RAN node 912.

Any of the RAN nodes 911 and 912 can terminate the air interface protocol and can be the first point of contact for the UEs 901 and 902. In some embodiments, any of the RAN nodes 911 and 912 can fulfill various logical functions for the RAN 910 including, but not limited to, radio network controller (RNC) functions such as radio bearer management, uplink and downlink dynamic radio resource management and data packet scheduling, and mobility management.

In accordance with some embodiments, the UEs 901 and 902 can be configured to communicate using Orthogonal Frequency-Division Multiplexing (OFDM) communication signals with each other or with any of the RAN nodes 911 and 912 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 911 and 912 to the UEs 901 and 902, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 901 and 902. The physical downlink control channel (PDCCH) may carry information about the transport format and resource allocations related to the PDSCH channel, among other things. It may also inform the UEs 901 and 902 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 911 and 912 based on channel quality information fed back from any of the UEs 901 and 902. The downlink resource assignment information may be sent on the PDCCH used for (e.g., assigned to) each of the UEs 901 and 902.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 910 is shown to be communicatively coupled to a core network (CN) 920—via an S1 interface 913. In embodiments, the CN 920 may be an evolved packet core (EPC) network, a NextGen Packet Core (NPC) network, or some other type of CN. In this embodiment the S1 interface 913 is split into two parts: the S1-U interface 914, which carries traffic data between the RAN nodes 911 and 912 and the serving gateway (S-GW) 922, and the S1-mobility management entity (MME) interface 915, which is a signaling interface between the RAN nodes 911 and 912 and MMEs 921.

In this embodiment, the CN 920 comprises the MMEs 921, the S-GW 922, the Packet Data Network (PDN) Gateway (P-GW) 923, and a home subscriber server (HSS) 924. The MMEs 921 may be similar in function to the control plane of legacy Serving General Packet Radio Service (GPRS) Support Nodes (SGSN). The MMEs 921 may manage mobility aspects in access such as gateway selection and tracking area list management. The HSS 924 may comprise a database for network users, including subscription-related information to support the network entities' handling of communication sessions. The CN 920 may comprise one or several HSSs 924, depending on the number of mobile subscribers, on the capacity of the equipment, on the organization of the network, etc. For example, the HSS 924 can provide support for routing/roaming, authentication, authorization, naming/addressing resolution, location dependencies, etc.

The S-GW 922 may terminate the S1 interface 913 towards the RAN 910, and routes data packets between the RAN 910 and the CN 920. In addition, the S-GW 922 may be a local mobility anchor point for inter-RAN node handovers and also may provide an anchor for inter-3GPP mobility. Other responsibilities may include lawful intercept, charging, and some policy enforcement.

The P-GW 923 may terminate an SGi interface toward a PDN. The P-GW 923 may route data packets between the EPC network 923 and external networks such as a network including the application server 930 (alternatively referred to as application function (AF)) via an Internet Protocol (IP) interface 925. Generally, the application server 930 may be an element offering applications that use IP bearer resources with the core network (e.g., UMTS Packet Services (PS) domain, LTE PS data services, etc.). In this embodiment, the P-GW 923 is shown to be communicatively coupled to an application server 930 via an IP communications interface 925. The application server 930 can also be configured to support one or more communication services (e.g., Voice-over-Internet Protocol (VoIP) sessions, PTT sessions, group communication sessions, social networking services, etc.) for the UEs 901 and 902 via the CN 920.

The P-GW 923 may further be a node for policy enforcement and charging data collection. Policy and Charging Enforcement Function (PCRF) 1026 is the policy and charging control element of the CN 920. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1026 may be communicatively coupled to the application server 930 via the P-GW 923. The application server 930 may signal the PCRF 1026 to indicate a new service flow and select the appropriate Quality of Service (QoS) and charging parameters. The PCRF 1026 may provision this rule into a Policy and Charging Enforcement Function (PCEF) (not shown) with the appropriate traffic flow template (TFT) and QoS class of identifier (QCI), which commences the QoS and charging as specified by the application server 930.

Figure 10:
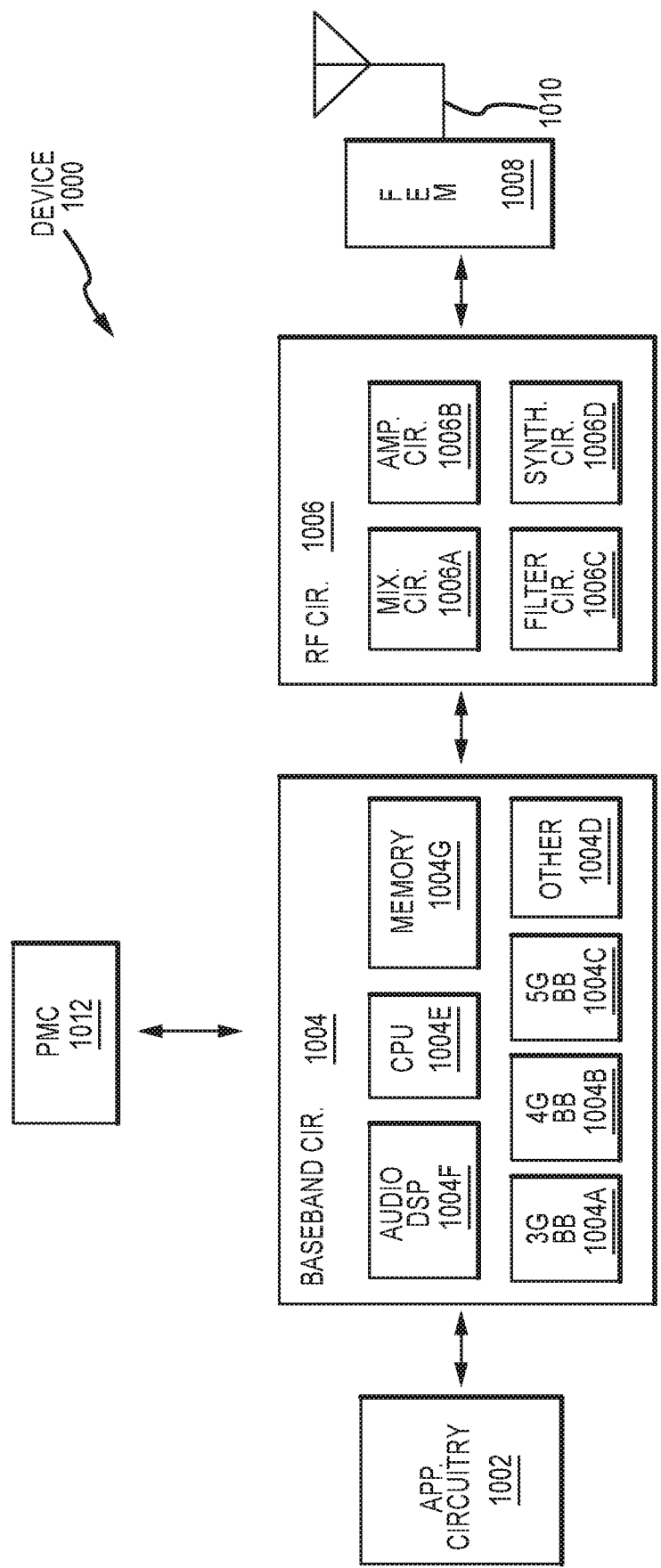
FIG. 10 illustrates example components of a wireless communication device in accordance with one or more embodiments.

FIG. 10 illustrates example components of a device in accordance with some embodiments. In some embodiments, the device 1000 may include application circuitry 1002, baseband circuitry 1004, Radio Frequency (RF) circuitry 1006, front-end module (FEM) circuitry 1008, one or more antennas 1010, and power management circuitry (PMC) 1012 coupled together at least as shown. The components of the illustrated device 1000 may be included in a UE or a RAN node. In some embodiments, the device 1000 may include less elements (e.g., a RAN node may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a third generation (3G) baseband processor 1004A, a fourth generation (4G) baseband processor 1004B, a fifth generation (5G) baseband processor 1004C, or other baseband processor(s) 1004D for other existing generations, generations in development or to be developed in the future (e.g., second generation (2G), sixth generation (6G), etc.). The baseband circuitry 1004 (e.g., one or more of baseband processors 1004A-D) may handle various radio control functions that enable communication with one or more radio networks via the RF circuitry 1006. In other embodiments, some or all of the functionality of baseband processors 1004A-D may be included in modules stored in the memory 1004G and executed via a Central Processing Unit (CPU) 1004E. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include one or more audio digital signal processor(s) (DSP) 1004F. The audio DSP(s) 1004F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the receive signal path of the RF circuitry 1006 may include mixer circuitry 1006*a*, amplifier circuitry 1006*b* and filter circuitry 1006*c*. In some embodiments, the transmit signal path of the RF circuitry 1006 may include filter circuitry 1006*c* and mixer circuitry 1006*a*. RF circuitry 1006 may also include synthesizer circuitry 1006*d* for synthesizing a frequency for use by the mixer circuitry 1006*a* of the receive signal path and the transmit signal path. In some embodiments, the mixer circuitry 1006*a* of the receive signal path may be configured to down-convert RF signals received from the FEM circuitry 1008 based on the synthesized frequency provided by synthesizer circuitry 1006*d*. The amplifier circuitry 1006*b* may be configured to amplify the down-converted signals and the filter circuitry 1006*c* may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006*a* of the receive signal path may comprise passive mixers, although the scope of the embodiments is not limited in this respect.

In some embodiments, the mixer circuitry 1006*a* of the transmit signal path may be configured to up-convert input baseband signals based on the synthesized frequency provided by the synthesizer circuitry 1006*d* to generate RF output signals for the FEM circuitry 1008. The baseband signals may be provided by the baseband circuitry 1004 and may be filtered by filter circuitry 1006*c*.

In some embodiments, the mixer circuitry 1006*a* of the receive signal path and the mixer circuitry 1006*a* of the transmit signal path may include two or more mixers and may be arranged for quadrature downconversion and upconversion, respectively. In some embodiments, the mixer circuitry 1006*a* of the receive signal path and the mixer circuitry 1006*a* of the transmit signal path may include two or more mixers and may be arranged for image rejection (e.g., Hartley image rejection). In some embodiments, the mixer circuitry 1006*a* of the receive signal path and the mixer circuitry 1006*a* may be arranged for direct downconversion and direct upconversion, respectively. In some embodiments, the mixer circuitry 1006*a* of the receive signal path and the mixer circuitry 1006*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006*d* may be a fractional-N synthesizer or a fractional N/N+1 synthesizer, although the scope of the embodiments is not limited in this respect as other types of frequency synthesizers may be suitable. For example, synthesizer circuitry 1006*d* may be a delta-sigma synthesizer, a frequency multiplier, or a synthesizer comprising a phase-locked loop with a frequency divider.

The synthesizer circuitry 1006*d* may be configured to synthesize an output frequency for use by the mixer circuitry 1006*a* of the RF circuitry 1006 based on a frequency input and a divider control input. In some embodiments, the synthesizer circuitry 1006*d* may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006*d* of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010. In various embodiments, the amplification through the transmit or receive signal paths may be done solely in the RF circuitry 1006, solely in the FEM 1008, or in both the RF circuitry 1006 and the FEM 1008.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010).

In some embodiments, the PMC 1012 may manage power provided to the baseband circuitry 1004. In particular, the PMC 1012 may control power-source selection, voltage scaling, battery charging, or DC-to-DC conversion. The PMC 1012 may often be included when the device 1000 is capable of being powered by a battery, for example, when the device is included in a UE. The PMC 1012 may increase the power conversion efficiency while providing desirable implementation size and heat dissipation characteristics.

While FIG. 10 shows the PMC 1012 coupled only with the baseband circuitry 1004. However, in other embodiments, the PMC 10 12 may be additionally or alternatively coupled with, and perform similar power management operations for, other components such as, but not limited to, application circuitry 1002, RF circuitry 1006, or FEM 1008.

In some embodiments, the PMC 1012 may control, or otherwise be part of, various power saving mechanisms of the device 1000. For example, if the device 1000 is in an RRC_Connected state, where it is still connected to the RAN node as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC_Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used execute Layer 3, Layer 2, or Layer 1 functionality, while processors of the application circuitry 1004 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
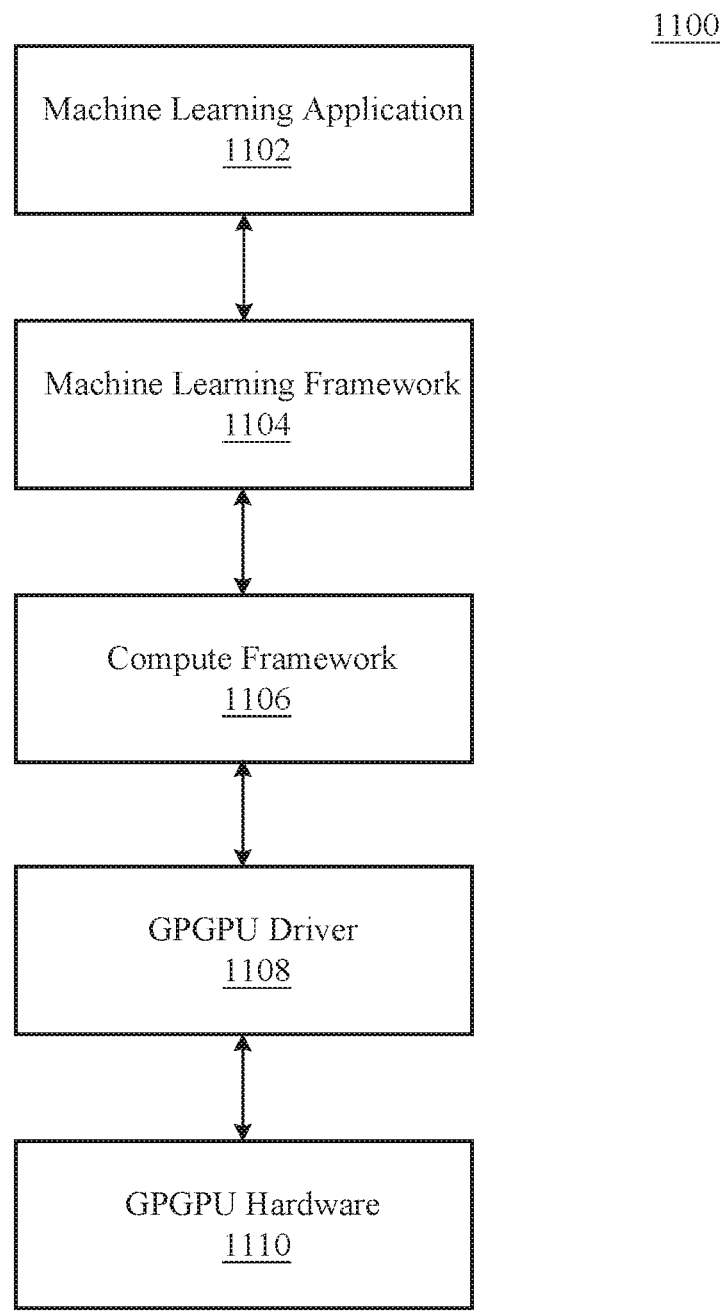
FIG. 11 is a generalized diagram of a machine learning software stack in accordance with one or more embodiments.

FIG. 11 is a generalized diagram of a machine learning software stack 1100. A machine learning application 1102 can be configured to train a neural network using a training dataset or to use a trained deep neural network to implement machine intelligence. The machine learning application 1102 can include training and inference functionality for a neural network and/or specialized software that can be used to train a neural network before deployment. The machine learning application 1102 can implement any type of machine intelligence including but not limited to image recognition, mapping and localization, autonomous navigation, speech synthesis, medical imaging, or language translation.

Hardware acceleration for the machine learning application 1102 can be enabled via a machine learning framework 1104. The machine learning framework 1104 can provide a library of machine learning primitives. Machine learning primitives are basic operations that are commonly performed by machine learning algorithms. Without the machine learning framework 1104, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 1104. Exemplary primitives include tensor convolutions, activation functions, and pooling, which are computational operations that are performed while training a convolutional neural network (CNN). The machine learning framework 1104 can also provide primitives to implement basic linear algebra subprograms performed by many machine-learning algorithms, such as matrix and vector operations.

The machine learning framework 1104 can process input data received from the machine learning application 1102 and generate the appropriate input to a compute framework 1106. The compute framework 1106 can abstract the underlying instructions provided to the GPGPU driver 1108 to enable the machine learning framework 1104 to take advantage of hardware acceleration via the GPGPU hardware 1110 without requiring the machine learning framework 1104 to have intimate knowledge of the architecture of the GPGPU hardware 1110. Additionally, the compute framework 1106 can enable hardware acceleration for the machine learning framework 1104 across a variety of types and generations of the GPGPU hardware 1110.

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described herein present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 12:
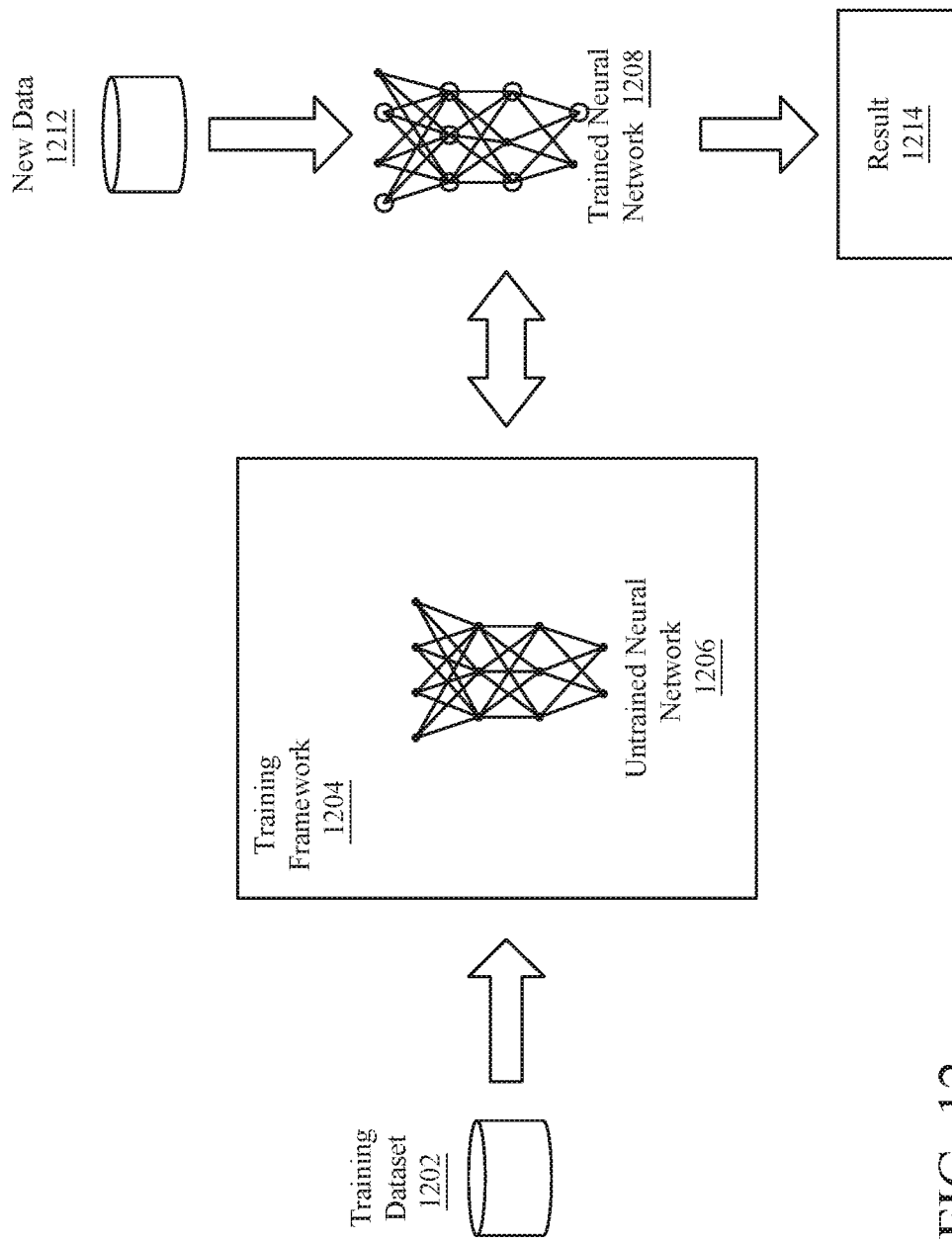
FIG. 12 illustrates training and deployment of a deep neural network in accordance with one or more embodiments.

FIG. 12 illustrates training and deployment of a deep neural network. Once a given network has been structured for a task the neural network is trained using a training dataset 1202. Various training frameworks have been developed to enable hardware acceleration of the training process. For example, the machine learning framework 1104 of FIG. 11 may be configured as a training framework 1204. The training framework 1204 can hook into an untrained neural network 1206 and enable the untrained neural net to be trained using the parallel processing resources described herein to generate a trained neural network 1208. To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 1202 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1204 can adjust to adjust the weights that control the untrained neural network 1206. The training framework 1204 can provide tools to monitor how well the untrained neural network 1206 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural network 1208. The trained neural network 1208 can then be deployed to implement any number of machine learning operations.

Unsupervised learning is a learning method in which the network attempts to train itself using unlabeled data. Thus, for unsupervised learning the training dataset 1202 will include input data without any associated output data. The untrained neural network 1206 can learn groupings within the unlabeled input and can determine how individual inputs are related to the overall dataset. Unsupervised training can be used to generate a self-organizing map, which is a type of trained neural network 1207 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1202 includes a mix of labeled and unlabeled data of the same distribution. Incremental learning is a variant of supervised learning in which input data is continuously used to further train the model. Incremental learning enables the trained neural network 1208 to adapt to the new data 1212 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

The following examples pertain to further embodiments. Example one includes apparatus of a multiagent system comprising a decision system coupled with a processing unit to execute a decision process in response to an event, and a radio-frequency (RF) transceiver to couple the decision system to a processing unit of a remote device, wherein the processing unit of the remote device is to process a unit of analysis on sensor data received from a sensor of the remote device, and to provide a latency estimate to process the unit of analysis to the decision system, wherein the decision system utilizes the latency estimate received from the remote device as part of the decision process. Example two may include the subject matter of example one or any of the examples described herein, wherein latency estimate comprises a time estimate involved for the processing unit to process the unit of analysis. Example three may include the subject matter of example one or any of the examples described herein, wherein the decision system is to determine if the latency estimate meets a time tradeoff in the decision process, and to wait for the unit of analysis from the processing unit before completing execution of the decision process if the latency estimate is met. Example four may include the subject matter of example one or any of the examples described herein, wherein the decision system further is to determine if an accuracy tradeoff is met, and to continue to execute the decision process if the accuracy tradeoff is met. Example five may include the subject matter of example one or any of the examples described herein, wherein the decision system includes decision logic to determine an urgency of the event, to determine a decision time horizon, to provide a latency assessment, or to process accumulated information, or a combination thereof, as part of the decision process. Example six may include the subject matter of example one or any of the examples described herein, wherein the remote device comprises an automobile or a drone. Example seven may include the subject matter of example one or any of the examples described herein, wherein the RF transceiver is to couple to the one or more additional remote devices via a Fifth Generation (5G) radio link, via a PC5 interface, via an IEEE 802.11x radio link, or via a mesh network, or a combination thereof.

Example eight includes a system comprising a processing unit to process a unit of analysis on sensor data received from a sensor, and to provide a latency estimate to process the unit of analysis, and a decision system coupled with the processing unit to execute a decision process in response to an event, wherein the decision system utilizes the latency estimate as part of the decision process. Example nine may include the subject matter of example eight or any of the examples described herein, wherein latency estimate comprises a time estimate involved for the processing unit to process the unit of analysis. Example ten may include the subject matter of example eight or any of the examples described herein, wherein the decision system is to determine if the latency estimate meets a time tradeoff in the decision process, and to wait for the unit of analysis from the processing unit before completing execution of the decision process if the latency estimate is met. Example eleven may include the subject matter of example eight or any of the examples described herein, wherein the decision system further is to determine if an accuracy tradeoff is met, and to continue to execute the decision process if the accuracy tradeoff is met. Example twelve may include the subject matter of example eight or any of the examples described herein, wherein the processing unit and the decision system are disposed in a single device. Example thirteen may include the subject matter of example eight or any of the examples described herein, wherein the decision system includes decision logic to determine an urgency of the event, to determine a decision time horizon, to provide a latency assessment, or to process accumulated information, or a combination thereof, as part of the decision process. Example fourteen may include the subject matter of example eight or any of the examples described herein, further comprising a radio-frequency (RF) transceiver to couple to one or more additional processing units to obtain a unit of analysis processed on sensor data received from a sensor of one or more devices. Example fifteen may include the subject matter of example eight or any of the examples described herein, wherein the RF transceiver is to couple to one or more devices via a Fifth Generation (5G) radio link, via a PC5 interface, via an IEEE 802.11x radio link, or via a mesh network, or a combination thereof.

Example sixteen includes one or more machine-readable media having instructions stored thereon that, if executed by an apparatus of a multiagent system, result in executing a decision process in response to an event, receiving a latency estimate from a processing unit of a remote device, wherein the processing unit of the remote device is to process a unit of analysis on sensor data received from a sensor of the remote device, and using the latency estimate received from the remote device as part of the decision process. Example seventeen may include the subject matter of example sixteen or any of the examples described herein, wherein latency estimate comprises a time estimate involved for the processing unit to process the unit of analysis. Example eighteen may include the subject matter of example sixteen or any of the examples described herein, wherein the instructions, if executed, further result in determining if the latency estimate meets a time tradeoff in the decision process, and waiting for the unit of analysis from the processing unit before completing execution of the decision process if the latency estimate is met. Example nineteen may include the subject matter of example sixteen or any of the examples described herein, wherein the instructions, if executed, further result in determining if an accuracy tradeoff is met, and continuing to execute the decision process if the accuracy tradeoff is met. Example twenty may include the subject matter of example sixteen or any of the examples described herein, wherein the instructions, if executed, further result in determining an urgency of the event, determining a decision time horizon, providing a latency assessment, processing accumulated information, or a combination thereof, as part of the decision process. Example twenty-one may include the subject matter of example sixteen or any of the examples described herein, wherein the remote device comprises an automobile or a drone. Example twenty-two may include the subject matter of example sixteen or any of the examples described herein, wherein the instructions, if executed, further result in receiving the latency estimate from one or more additional remote devices via a Fifth Generation (5G) radio link, via a PC5 interface, via an IEEE 802.11x radio link, or via a mesh network, or a combination thereof.

Example twenty-three includes one or more machine-readable media having instructions stored thereon that, if executed, result in processing a unit of analysis on sensor data received from a sensor, providing a latency estimate to process the unit of analysis, and executing a decision process in response to an event, wherein the latency estimate is utilized as part of the decision process. Example twenty-four may include the subject matter of example twenty-three or any of the examples described herein, wherein latency estimate comprises a time estimate involved to process the unit of analysis. Example twenty-five may include the subject matter of example twenty-three or any of the examples described herein, wherein the instructions, if executed, further result in determining if the latency estimate meets a time tradeoff in the decision process, and waiting for the unit of analysis to be processed before completing execution of the decision process if the latency estimate is met. Example twenty-six may include the subject matter of example twenty-three or any of the examples described herein, wherein the instructions, if executed, further result in determining if an accuracy tradeoff is met, and continuing to execute the decision process if the accuracy tradeoff is met. Example twenty-seven may include the subject matter of example twenty-three or any of the examples described herein, wherein said processing, said providing, and said executing, are performed by a single device. Example twenty-eight may include the subject matter of example twenty-three or any of the examples described herein, wherein the instructions, if executed, further result in determining an urgency of the event, determining a decision time horizon, providing a latency assessment, or processing accumulated information, or a combination thereof, as part of the decision process. Example twenty-nine may include the subject matter of example twenty-three or any of the examples described herein, wherein the instructions, if executed, further result in obtaining a unit of analysis to be processed on sensor data received from a sensor of one or more devices. Example thirty may include the subject matter of example twenty-three or any of the examples described herein, wherein said obtaining is performed via a Fifth Generation (5G) radio link, via a PC5 interface, via an IEEE 802.11x radio link, or via a mesh network, or a combination thereof.

Example thirty-one includes an apparatus of a multiagent system comprising means for executing a decision process in response to an event, means for receiving a latency estimate from a processing unit of a remote device, wherein the processing unit of the remote device is to process a unit of analysis on sensor data received from a sensor of the remote device, and means for using the latency estimate received from the remote device as part of the decision process. Example thirty-two may include the subject matter of example thirty-one or any of the examples described herein, wherein latency estimate comprises a time estimate involved for the processing unit to process the unit of analysis. Example thirty-three may include the subject matter of example thirty-one or any of the examples described herein, further comprising means for determining if the latency estimate meets a time tradeoff in the decision process, and means for waiting for the unit of analysis from the processing unit before completing execution of the decision process if the latency estimate is met. Example thirty-four may include the subject matter of example thirty-one or any of the examples described herein, further comprising means for determining if an accuracy tradeoff is met, and means for continuing to execute the decision process if the accuracy tradeoff is met. Example thirty-five may include the subject matter of example thirty-one or any of the examples described herein, further comprising means for determining an urgency of the event, means for determining a decision time horizon, means for providing a latency assessment, means for processing accumulated information, or a combination thereof, as part of the decision process. Example thirty-six may include the subject matter of example thirty-one or any of the examples described herein, wherein the remote device comprises an automobile or a drone. Example thirty-seven may include the subject matter of example thirty-one or any of the examples described herein, further comprising means for receiving the latency estimate from one or more additional remote devices via a Fifth Generation (5G) radio link, via a PC5 interface, via an IEEE 802.11x radio link, or via a mesh network, or a combination thereof.

Example thirty-eight includes a system comprising means for processing a unit of analysis on sensor data received from a sensor, means for providing a latency estimate to process the unit of analysis, and means for executing a decision process in response to an event, wherein the latency estimate is utilized as part of the decision process. Example thirty-nine may include the subject matter of example thirty-eight or any of the examples described herein, wherein latency estimate comprises a time estimate involved to process the unit of analysis. Example forty may include the subject matter of example thirty-eight or any of the examples described herein, further comprising means for determining if the latency estimate meets a time tradeoff in the decision process, and means for waiting for the unit of analysis to be processed before completing execution of the decision process if the latency estimate is met. Example forty-one may include the subject matter of example thirty-eight or any of the examples described herein, further comprising means for determining if an accuracy tradeoff is met, and means for continuing to execute the decision process if the accuracy tradeoff is met. Example forty-two may include the subject matter of example thirty-eight or any of the examples described herein, wherein said means for processing, said means for providing, and said means for executing, are disposed a single device. Example forty-three may include the subject matter of example thirty-eight or any of the examples described herein, further comprising means for determining an urgency of the event, means for determining a decision time horizon, means for providing a latency assessment, or means for processing accumulated information, or a combination thereof, as part of the decision process. Example forty-four may include the subject matter of example thirty-eight or any of the examples described herein, further comprising means for obtaining a unit of analysis to be processed on sensor data received from a sensor of one or more devices. Example forty-five may include the subject matter of example thirty-eight or any of the examples described herein, wherein said means for obtaining comprises via a Fifth Generation (5G) radio link, a PC5 interface, an IEEE 802.11x radio link, or a mesh network, or a combination thereof.

Example forty-six includes a method comprising executing a decision process in response to an event, receiving a latency estimate from a processing unit of a remote device, wherein the processing unit of the remote device is to process a unit of analysis on sensor data received from a sensor of the remote device, and using the latency estimate received from the remote device as part of the decision process. Example forty-seven may include the subject matter of example forty-six or any of the examples described herein, wherein latency estimate comprises a time estimate involved for the processing unit to process the unit of analysis. Example forty-eight may include the subject matter of example forty-six or any of the examples described herein, further comprising determining if the latency estimate meets a time tradeoff in the decision process, and waiting for the unit of analysis from the processing unit before completing execution of the decision process if the latency estimate is met. Example forty-nine may include the subject matter of example forty-six or any of the examples described herein, further comprising determining if an accuracy tradeoff is met, and continuing to execute the decision process if the accuracy tradeoff is met. Example fifty may include the subject matter of example forty-six or any of the examples described herein, further comprising determining an urgency of the event, determining a decision time horizon, providing a latency assessment, processing accumulated information, or a combination thereof, as part of the decision process. Example fifty-one may include the subject matter of example forty-six or any of the examples described herein, wherein the remote device comprises an automobile or a drone. Example fifty-two may include the subject matter of example forty-six or any of the examples described herein, further comprising receiving the latency estimate from one or more additional remote devices via a Fifth Generation (5G) radio link, via a PC5 interface, via an IEEE 802.11x radio link, or via a mesh network, or a combination thereof.

Example fifty-three includes a method comprising processing a unit of analysis on sensor data received from a sensor, providing a latency estimate to process the unit of analysis, and executing a decision process in response to an event, wherein the latency estimate is utilized as part of the decision process. Example fifty-four may include the subject matter of example fifty-three or any of the examples described herein, wherein latency estimate comprises a time estimate involved to process the unit of analysis. Example fifty-five may include the subject matter of example fifty-three or any of the examples described herein, further comprising determining if the latency estimate meets a time tradeoff in the decision process, and waiting for the unit of analysis to be processed before completing execution of the decision process if the latency estimate is met. Example fifty-six may include the subject matter of example fifty-three or any of the examples described herein, further comprising determining if an accuracy tradeoff is met, and continuing to execute the decision process if the accuracy tradeoff is met. Example fifty-seven may include the subject matter of example fifty-three or any of the examples described herein, wherein said processing, said providing, and said executing, are performed by a single device. Example fifty-eight may include the subject matter of example fifty-three or any of the examples described herein, further comprising determining an urgency of the event, determining a decision time horizon, providing a latency assessment, or processing accumulated information, or a combination thereof, as part of the decision process. Example fifty-nine may include the subject matter of example fifty-three or any of the examples described herein, further comprising obtaining a unit of analysis to be processed on sensor data received from a sensor of one or more devices. Example sixty may include the subject matter of example fifty-three or any of the examples described herein, wherein said obtaining is performed via a Fifth Generation (5G) radio link, via a PC5 interface, via an IEEE 802.11x radio link, or via a mesh network, or a combination thereof.

Example sixty-one includes machine-readable medium including code, when executed, to cause a machine to perform the method of any of the examples herein. Example sixty-two includes machine-readable storage including machine-readable instructions, when executed, to implement a method or realize an apparatus as recited in any of the examples herein.

In various embodiments, the operations discussed herein, e.g., with reference to the figures described herein, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to the present figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus of a multiagent system, comprising:
   a decision system coupled with a processing unit to execute a decision process in response to an event; and
   a radio-frequency (RF) transceiver to couple the decision system to a processing unit of a remote device, wherein the processing unit of the remote device is to process a unit of analysis on sensor data received from a sensor of the remote device, and to receive from the remote device a latency estimate for the processing unit of the remote device to process the unit of analysis;
   wherein if there is enough time within a decision time horizon to wait for the processed unit of analysis in view of the latency estimate, then the decision system waits to receive the processed unit of analysis from the remote device and then executes the decision process using the processed unit of analysis, and otherwise executes the decision process without waiting for the processed unit of analysis from the remote device.

2. The apparatus of claim 1, wherein the latency estimate comprises a time estimate involved for the processing unit of the remote device to process the unit of analysis.

3. The apparatus of claim 1, wherein the decision system includes decision logic to determine an urgency of the event, to determine the decision time horizon, to provide a latency assessment, or to process accumulated information, or a combination thereof, as part of the decision process.

4. The apparatus of claim 1, wherein the remote device comprises an automobile or a drone.

5. The apparatus of claim 1, wherein the RF transceiver is to couple to the one or more additional remote devices via a Fifth Generation (5G) radio link, via a PC5 interface, via an IEEE 802.11x radio link, or via a mesh network, or a combination thereof.

6. A system, comprising:
a processing unit to process a unit of analysis on sensor data received from a sensor, and to provide a latency estimate to process the unit of analysis; and
a decision system coupled with the processing unit to execute a decision process in response to an event;
wherein if there is enough time within a decision time horizon to wait for the processed unit of analysis in view of the latency estimate, then the decision system waits for the processed unit of analysis and then executes the decision process using the processed unit of analysis, and otherwise executes the decision process without waiting for the processed unit of analysis.

7. The system of claim 6, wherein the latency estimate comprises a time estimate involved for the processing unit to process the unit of analysis.

8. The system of claim 6, wherein the processing unit and the decision system are disposed in a single device.

9. The system of claim 6, wherein the decision system includes decision logic to determine an urgency of the event, to determine the decision time horizon, to provide a latency assessment, or to process accumulated information, or a combination thereof, as part of the decision process.

10. The apparatus of claim 6, further comprising a radio-frequency (RF) transceiver to couple to one or more additional processing units to obtain a unit of analysis processed on sensor data received from a sensor of one or more devices.

11. The apparatus of claim 10, wherein the RF transceiver is to couple to one or more devices via a Fifth Generation (5G) radio link, via a PC5 interface, via an IEEE 802.11x radio link, or via a mesh network, or a combination thereof.

12. One or more non-transitory machine-readable media having instructions stored thereon that, if executed by an apparatus of a multiagent system, result in:
executing a decision process in response to an event;
receiving a latency estimate from a processing unit of a remote device, wherein the processing unit of the remote device is to process a unit of analysis on sensor data received from a sensor of the remote device; and
if there is enough time within a decision time horizon to wait for the processed unit of analysis in view of the latency estimate, then
waiting to receive the processed unit of analysis from the remote device and then executing the decision process using the processed unit of analysis, and otherwise executing the decision process without waiting for the processed unit of analysis from the remote device.

13. The one or more non-transitory machine-readable media of claim 12, wherein the latency estimate comprises a time estimate involved for the processing unit to process the unit of analysis.

14. The one or more non-transitory machine-readable media of claim 12, wherein the instructions, if executed, further result in determining an urgency of the event, determining the decision time horizon, providing a latency assessment, processing accumulated information, or a combination thereof, as part of the decision process.

15. The one or more non-transitory machine-readable media of claim 12, wherein the remote device comprises an automobile or a drone.

16. The one or more non-transitory machine-readable media of claim 12, wherein the instructions, if executed, further result in receiving the latency estimate from one or more additional remote devices via a Fifth Generation (5G) radio link, via a PC5 interface, via an IEEE 802.11x radio link, or via a mesh network, or a combination thereof.

17. One or more non-transitory machine-readable media having instructions stored thereon that, if executed, result in:
processing a unit of analysis on sensor data received from a sensor;
providing a latency estimate to process the unit of analysis; and
executing a decision process in response to an event;
wherein if there is enough time within a decision time horizon to wait for the processed unit of analysis in view of the latency estimate, then
waiting for the processed unit of analysis and then executing the decision process using the processed unit of analysis, and
otherwise executing the decision process without waiting for the processed unit of analysis.

18. The system of claim 17, wherein the latency estimate comprises a time estimate involved to process the unit of analysis.

19. The one or more non-transitory machine-readable media of claim 17, wherein said processing, said providing, and said executing, are performed by a single device.

20. The one or more non-transitory machine-readable media of claim 17, wherein the instructions, if executed, further result in determining an urgency of the event, determining the decision time horizon, providing a latency assessment, or processing accumulated information, or a combination thereof, as part of the decision process.

21. The one or more non-transitory machine-readable media of claim 17, wherein the instructions, if executed, further result in obtaining a unit of analysis to be processed on sensor data received from a sensor of one or more devices.

22. The one or more non-transitory machine-readable media of claim 21, wherein said obtaining is performed via a Fifth Generation (5G) radio link, via a PC5 interface, via an IEEE 802.11x radio link, or via a mesh network, or a combination thereof.

* * * * *